United States Patent [19]
Feng

[11] Patent Number: 5,826,009
[45] Date of Patent: Oct. 20, 1998

[54] PROTECTION OF SOFTWARE FROM PHYSICAL AND ELECTRONIC INTERROGATION BY SEALING AND CHECKING PASSWORD

[76] Inventor: Genquan Feng, P.O. Box 1796, New York, N.Y. 10185-0016

[21] Appl. No.: 506,642

[22] Filed: Jul. 25, 1995

Related U.S. Application Data

[63] Continuation-in-part of Ser. No. 551,297, Jul. 12, 1990, abandoned, and Ser. No. 938,859, Sep. 1, 1992, abandoned, and Ser. No. 276,674, Jul. 19, 1994.

[51] Int. Cl.⁶ .................................................. G06F 15/00
[52] U.S. Cl. ..................... 395/186; 395/188.01
[58] Field of Search .................. 395/186, 188.01; 380/3, 4, 25; 340/825.34; 235/380

[56] References Cited

U.S. PATENT DOCUMENTS

| | | | |
|---|---|---|---|
| 4,685,056 | 8/1987 | Barnsdale, Jr. et al. | 364/200 |
| 4,796,220 | 1/1989 | Wolfe | 364/900 |
| 4,817,140 | 3/1989 | Chandra et al. | 380/4 |
| 4,860,351 | 8/1989 | Weingart | 380/3 |
| 4,864,618 | 9/1989 | Wright et al. | 380/51 |
| 4,941,175 | 7/1990 | Enescu et al. | 380/4 |
| 5,056,009 | 10/1991 | Mizuta | 364/200 |
| 5,063,496 | 11/1991 | Dayan et al. | 395/700 |

OTHER PUBLICATIONS

ASUSTeK, "PVI–486AP4 User's Manual", Doc. No. AS9407L, Aug. 1994, pp. 3–1 through 3–35.

*Primary Examiner*—Dennis M. Butler

[57] ABSTRACT

Software in a dedicated computer is protected from physical and electronic unallowable interrogation (i.e. any physical and electronic interrogation which is not set up by the designer). When the unallowable interrogation is attempted, a destruction signal is generated to destroy the software protected, so that the unallowable interrogation can not be realized, therefore the unallowable interrogation is forbidden.

16 Claims, 5 Drawing Sheets

PROTECTION OF SOFTWARE FROM PHYSICAL AND ELECTRONIC INTERROGATION BY SEALING AND CHECKING PASSWORD

CROSS REFERENCE TO RELATED APPLICATION

This application is a continuation-in-part of U.S. Ser. No. 07/551,297, filed Jul. 12, 1990, (abandoned); and it is a continuation-in-part of U.S. Ser. No. 07/938,859, filed Aug. 1, 1992, now abandoned, and a CIP of patent application Ser. No. 08/276,674, filed Jul. 19, 1994, now pending

BACKGROUND OF THE INVENTION

1. Field of the Invention

This invention generally relates to a software protection system for a dedicated computer and, more particularly, to an integrated, hardware- and software-based arrangement for totally preventing software from being appropriated or copied by sealing.

2. Description of Related Art

The protection of software loaded into a computer is of increasing concern in the computer age. Generally, it is known to protect software by using special security software, or by using encoding-decoding or encrypting-decrypting protocols. However, such other security software and protocols can easily be compromised by known debugging, decoding and restore-backup techniques and programs specially designed to uncover the protected software. For example, Mr. Masaharu Mizita's inventions (U.S. Pat. No. 05,131,091 filed on Jul. 14, 1992 and U.S. Pat. No. 05,056,009 filed on Oct. 8, 1991) are two special cases for use of encoding method to protect the software. In these 2 inventions, Mr. Mizuta used a memory card, which includes semiconductor memory ICs, such as RAMs, as a special measure to store the software that is to be protected. Then he used special encoding methods invented by him to protect the stored software. As mentioned in these two inventions (Patents), Mr. Mizuta stated that "As is known, memory cards which include semiconductor memory ICs . . . are extremely high compared with those of hard disks," and he also said: the conventional IC memory card (ROM card), described in "IC Memory Card Guideline" (issued in September, 1980) . . . ". Therefore using the IC memory card to store software is not a new invention. The main invention of the two Patents for Mr. Mizuta is the special encoding methods (which is used in the card) to protect the software. But as mentioned above, any encoding method could be decoded by modern decoding technique, therefore Mr. Mizuta's Patents can not protect the software very well. The proper way to protect the software reliablely is to provide an integrated, hardware combined with software based system for totally protectin the software loaded in a computer. That is the main point of my invention as mentioned below.

The main differences between my invention and Mr. Mizuta's Patents are that Mr. Mizuta used encoding methods in his IC memory card to protect the software; whereas in my invention, it uses a detector to detect unallowable electrical and physical tampering of the main information parts of the computer and the memory which stores the software. This generates a destructive signal in response to s such detection and destroy the function of the memory which stores the software, then destroys the software stored in the memory. And makes the unallowable interrogation not realized, and forbids the interrogation of the software.

In brief, the main difference between my invention and Mizita's two Patents is as follows. In my invention using a software-auto-destroying board (SAD board) to destroy the software, makes the unallowable interrogation not to be realized. This causes the interrogation of the software to be forbiden. But, in Mr. Mizuta's inventions, he uses encoding method to potect the software, lets the software not to be interrogated with the computer, and does not destroy the software. Therefore, destroying the software when it is interrogatied is my invention, and never destroying the software only using encoding method to protect the software is Mizuta's inventions). That is the main difference between my invention and Mizuta's inventions. In order to avoid any confusion and emphasize the main difference between my invention and Mr. Mizuta's invention, I call my board "software-auto-destroying board" (SAD) to differentiate it from the "software protection board" used in Mr. Mizuta's inventions.

It is also known to protect software by a burn-in process in a special chip such as a EPROM or EEPROM. Although such burned-in software cannot be routinely copied, it can be read out or recorded during data processing through computer interface.

Special hardware can be used to protect software. However, hardware can be compromised or duplicate. The general state of the art is examplified by the following U.S. patents: U.S. Pat. Nos. 4,796,220; 4,817,140; 4,864,618; 4,941,175 and 5,063,496.

Another way to protect software is suggested by Mr. Steve H. Weingart, et al. (U.S. Pat. No. 4,870,351, filed: Nov. 4, 1986). The main point of that patent (Mr. Weingart's invention) is as follows. "A tamper-resistant package for distributing electromagnetic energy within a region occupied by the circuit to be protected . . . An impairing device responds to the comparator output to obliterate, destroy or otherwise impair the information stored in the electronic circuit which is being protected." Mr. Weingart's invention used electromagnetic energy within a region to detect unallowable tampering with the parts within that region and make a response to destroy the software. Mr. Weingart's invention could detect the tampering what comes from outside and moving the parts within the protecting region, but it can not refuse some one copying or tampering the software with the computer itself. For example some one could copy the software with regular copy process of the computer and never touch any parts within the protecting region.

My invention eliminated all the channels through which the software could be interrogated from outside, including: revised BIOS, that would cause the BIOS chip only recognizing limited number of keys, as well as, sealed all the main information parts of the computer, with this, the computer can only operate by a Batch file which is set up by the designer. No any other way can interrogate the computer and its software from outside. Based on the above, the only way to interrogate the software would be to tamper with the sealed main information parts of the computer. In my invention, I use SAD which would detect such tampering and generate a destructive signal that will destroy the software, making the unallowable interrogation can not be realized. Through this special way, in my invention, I overcome the shortcomings of Mr. Weingart's invention (i.e. someone could interrogate the software through the computer itself). That is the main difference between my invention and Mr. Weingart's invention, and also it is one of the main advantages of my invention. However, I use the special designed SAD board, which is designed by me, to detect the unallowable interrogation and destroy the software, it is quite different from the measurement suggested by Mr.

Weingart, (i.e. distributing electromagnetic energy within a region occupied by the circuit to be protected).

For the purpose of double protection of the software stored, we use a electronic number key to check the password setup by the designer; only user input the right password, then the software working.

SUMMARY OF THE INVENTION

1. Objects of the Invention

It is a general object of this invention to provide an integrated, hardware- and software-based system for totally protecting software loaded in a computer.

Another object of this invention is to make it impossible for even an experienced computer operator to appropriate software.

Still another object of this invention is to reliably protect the integrity of specially designed software against tampering, unauthorized access, illegal copying and vandalism.

Yet another object of this invention is to protect valuable proprietary and sensitive data bases from unauthorized disclosure.

2. Features of the Invention

In keeping with these objects, and others which will become apparent hereinafter, one feature of this invention resides, briefly stated, in a software protection system, and a method of protecting software, that comprises mounting a protection board in an expansion slot of a computer. The protection board is a data storage means and could be constituted by a special memory extension board, a hard disc, an optical disc, or any component capable of storing all or part of the software to be protected. A memory, such as a random access memory (RAM or SRAM) is mounted on the protection board, and stores at least essential data of the software to be protected. Such data can include the most important or sensitive parts of the software. The rest of the software is stored on a hard disc. Floppy discs are not used.

A detector is employed for detecting tampering with the computer, and for generating a destruct signal in response to such detection. Such tampering can be physical or electronic, i.e., copying the software or the essential part thereof. Means are provided for destroying the stored essential data of the software in response to generation of the destruct signal. The destroying means can be physical, e.g., chemical or explosive, and/or electronic, e.g. a high voltage signal.

For example, the detector may detect the physical removal of the "software-auto-destroying board" (SAD board) from its expansion slot. The SAD board has terminals that make electrical contact with sockets in the slot during normal operation. Upon removal of the SAD board from its slot, such electrical contact is broken, and this interruption in the electrical circuit, akin to the opening of a normally-closed switch, can be electrically detected and result in the generation of the aforementioned destruct signal. In a preferred embodiment, the signal is a high voltage which, when applied to the memory on-board the protection board, destroys the essential data of the software stored thereon.

The detector may also be designed to sense other tampering events, such as opening of the computer chassis, or removal of a different computer board from a different expansion slot. Thus, removal of, for example, the mother board can be the triggering event that results in the destruction of the stored essential data, after which, further operation of the computer is impossible.

Aside from such physical tampering events, this invention also prevents software appropriation, i.e., copying of the stored essential data or the entire software, via the keyboard. A computer operator can appropriate software by keyboard entry of such commands as COPY, RESTORE, BACKUP, GRAPH, DEBUG, PRINTOUT, etc., or the operator can make up his own program.

However, according to another aspect of this invention, such commands are not recognized. More particularly, the BIOS program, which interfaces all the keys on the keyboard with the microprocessor, is revised so that the microprocessor will only recognize and respond to a limited number of keys, namely: y, n, f, m, 0–9, enter, backup, space, shift, reset, f6, f7 and f10. The revised BIOS program locks out all the other keys present on a conventional keyboard. Thus, by deactivating the keys which are conventionally used to appropriate and copy software, the operator is defeated from attempting such appropriation and copying.

Moreover, rather than operating the computer on a disc operating system (DOS), the computer is run on a BAT file management set of command programs, each selectable by one of said aforementioned limited number of keys.

Moreover, the computer doesn't use any kind of serial-port and parallel-port, it uses a special converter (a special transferring board) to transform the monitor signals to video signals, then inputs them into a video-printer to print out the results (outputs).

Finally, for extra safety, the SAD board is sealed by being at least partly encapsulated in a sealing or potting compound. The revised BIOS program is installed on the computer's mother board via a separate chip which is likewise sealed. If desired, all interfaces-within the computer can be sealed.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
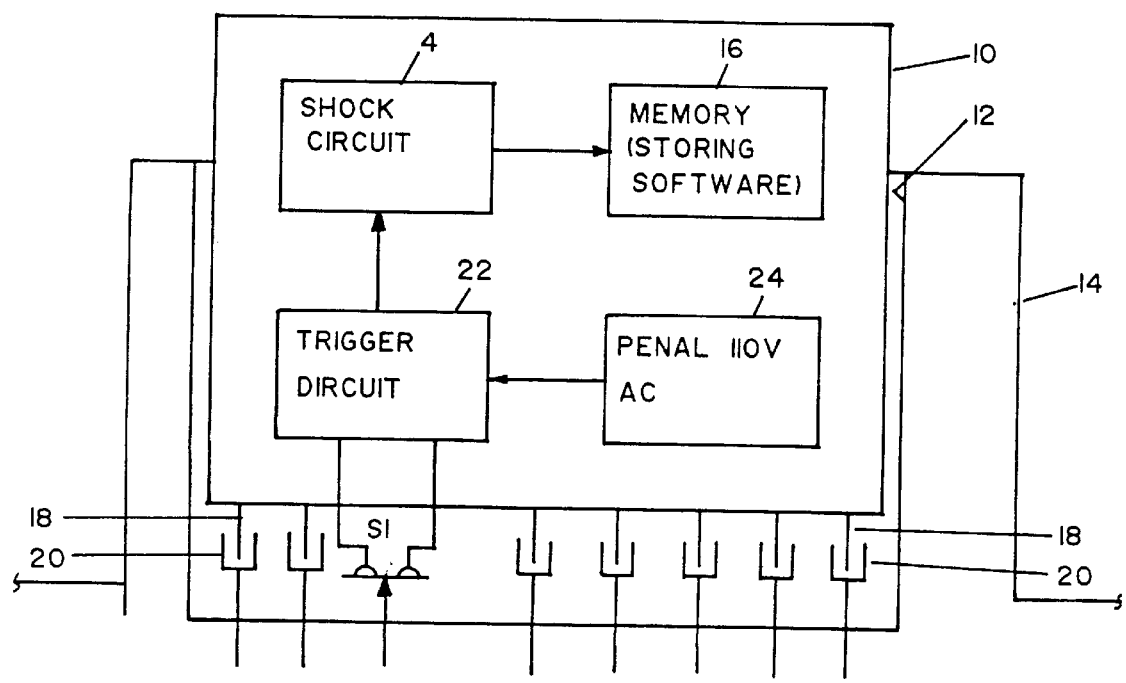
FIG. 1 is a schematic view of a SAD board mounted in an expansion slot of a computer according to this invention.

Referring initially to FIG. 1, a SAD board 10 is mounted in an expansion slot 12 of a computer 14 (shown in broken-away view). A memory 16, such as a RAM/SRAM, is mounted on-board the SAD board 10. Essential software data, such as important or sensitive data from a program or a data base, is stored in the memory 16. The remainder of the software is loaded on a hard disc. No floppy discs or floppy disc drives are used. The SAD board is a data storage means and could be constituted by a special memory extension board, a hard disc, an optical disc, or any component capable of storing all or part of the software to be protected.

The SAD board 10 has terminals 18 extending therefrom and making electrical contact with conductive sockets 20 within the slot 12. During normal operation, each terminal 18 and socket 20 form a closed circuit. If the SAD board were removed from the slot, each closed circuit would open, and interrupt the flow of electrical current. This is akin to opening a normally-closed switch and, for ease of illustration and discussion, one pair of the terminals 18 and sockets 20 is depicted in FIG. 1 as a normally-closed switch S1.

Figure 3:
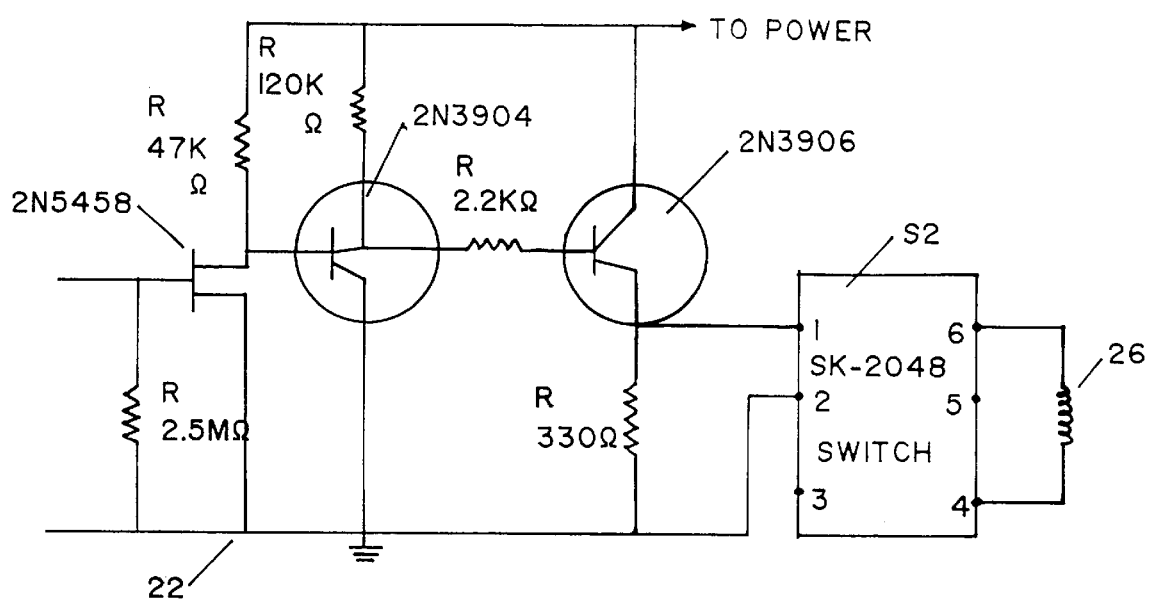
FIG. 3 is an electrical schematic of a tampering detector on-board the SAD board of FIG. 1.
Figure 4:
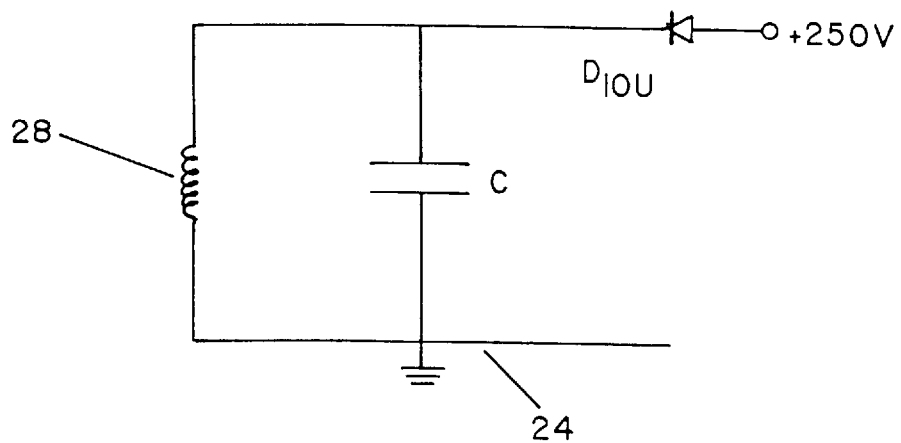
FIG. 4 is an electrical schematic of a destruct circuit on-board the SAD board of FIG. 1.

A detector or trigger circuit 22 is shown on-board the SAD board 10 in FIG. 1, and in isolation in FIG. 3. A shock circuit 24 is shown on-board the SAD board 10 in FIG. 1, and in isolation in FIG. 4. An on-board power supply 26 is connected to the trigger circuit 22 which, in turn, is coupled to the shock circuit 24 and, in turn, to the memory 16.

As shown in FIG. 3, during normal operation when switch S1 is closed, i.e. when the SAD board 10 is mounted in the expansion slot 12, then electronic switch S2 is open. No voltage exists across transformer primary coil 26. During tampering, switch S1 is opened due to removal of the SAD board 10, and the electronic switch S2 is closed. This causes the power supply voltage, e.g. 9 v DC, to be applied across the primary coil 26. The primary coil 26 is coupled to a step-up secondary coil 28 to increase the voltage at the output of the transformer to 250 v DC. This high voltage is thereupon applied to the memory 16 to destroy the stored essential data therein.

Figure 2:
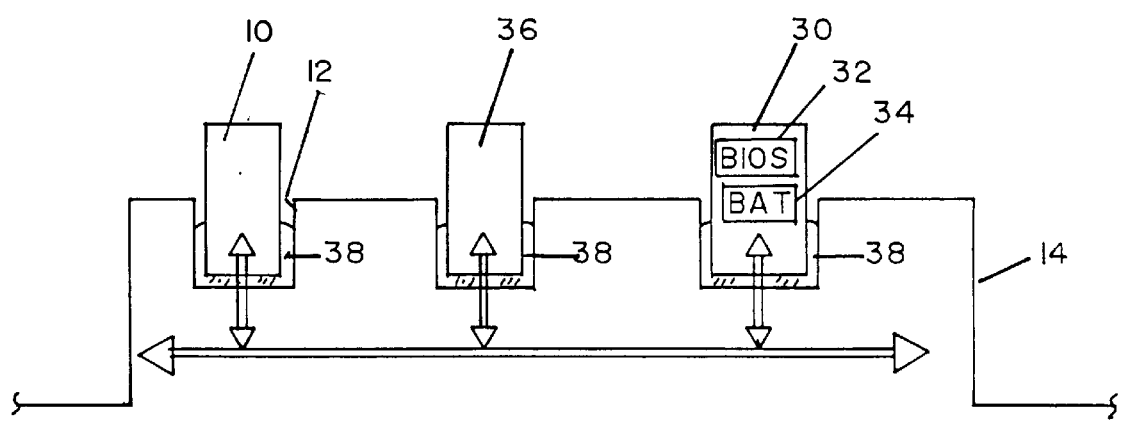
FIG. 2 is a schematic view of the SAD board of FIG. 1, together with additional boards mounted in the computer.

As shown in FIG. 2, the SAD board 10 in slot 12 is operatively connected to every other board in their respective slots in the computer. Board 30 is the mother board and, as described below, contains an on-board revised BIOS chip 32, and a microprocessor 34, or the computer itself, programmed to run on BAT files. Board 36 represents another memory.

The trigger and shock circuits on the SAD board can be designed to destroy the memory 16 not only when physical removal of the SAD board 10 itself is detected, but also when any other board, e.g., boards 30, 36, are shaken, removed or in any way disturbed in an unauthorized manner. Analogously, any other unauthorized event can trigger such memory destruction, e.g. opening up the computer chassis and, principally, copying of the stored essential data or the loaded software.

For increased security, a sealing compound 38 (see FIG. 2) is employed to encapsulate the SAD board, or at least the terminals thereof. Sealing compound can be used at any and all internal interfaces within the computer. J-B Welding (trademark) compound is a preferred sealing compound.

As previously mentioned, a separate BIOS chip 32 on the mother board 30 is employed to interface the microprocessor 34 and the keyboard. The BIOS program on the chip 32 is not the usual program wherein all the keys on a conventional keyboard are recognized, but only a limited number of keys are recognized, namely, y, n, f, m, 0–9, enter, backup, space, shift, reset, f6, f7 and f10. All other keys are not recognized, and such non-recognition extends especially to those keys related to copying, restoring, backing up, debugging, printing, and graphing, and labeled CTR, CD, CTR-P, r, i, alt, etc. Without computer access to the latter grouping of keys, the software cannot be electronically appropriated.

The microprocessor 34 is programmed to run all software using only a set of BAT files, each selectable by a number. Thus, the computer is never run on the disc operating system. The "AUTOEXEC.BAT" and "MANAGE.BAT" files are used to manage all files.

Figure 5:
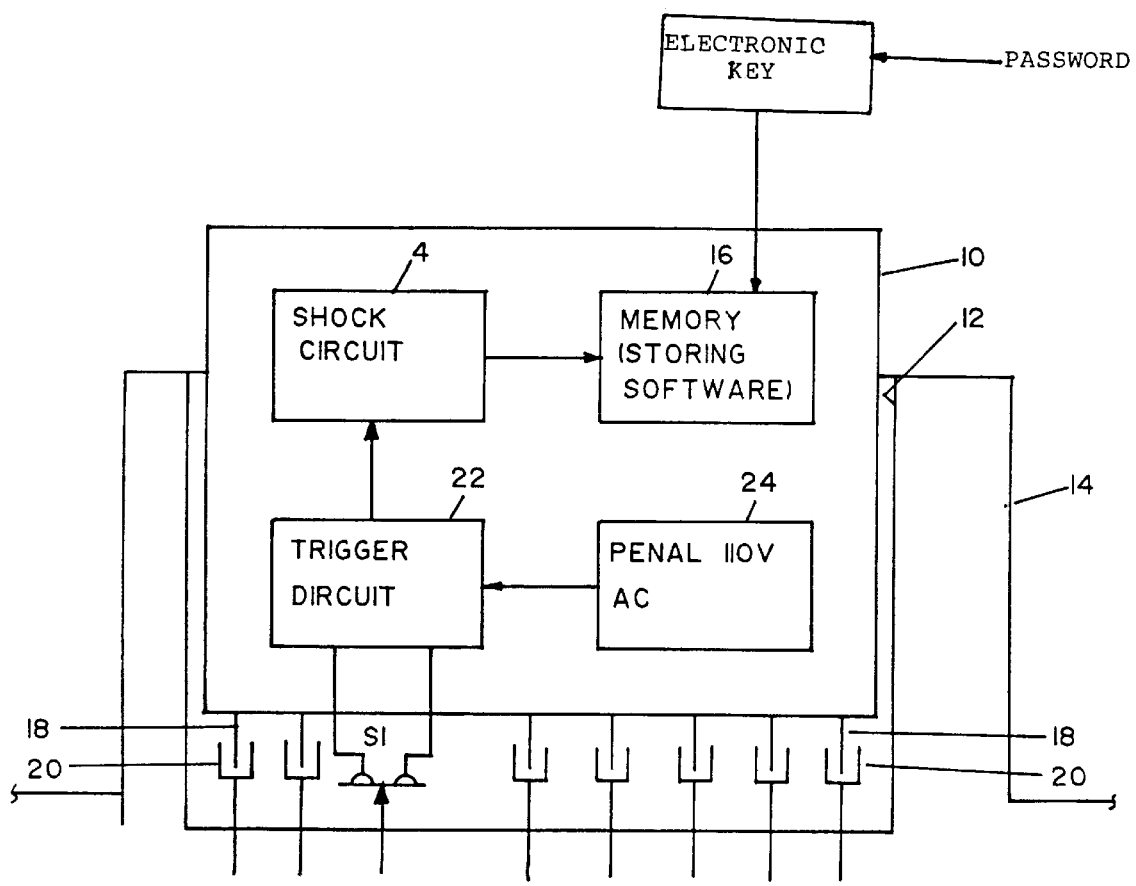
FIG. 5 is an electronical key to check the password input by user, the software begins to work only when the password is right.

FIG. 5 illustrated an electronic key 41 mounted on the output port of the computer, the key checks the password input by the user, when the password input is right, the key 41 starts the memory (storing software) 16 to be working, otherwise the memory(and the software stored) 16 is no working.

It will be understood that each of the elements described above, or two or more together, may also find a useful application in other types of constructions differing from the types described above.

While the invention has been illustrated and described as embodied in a software protection system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A soft-ware protection (i.e. protection from to be interrogated) system for a dedicated computer comprising:
   (a) a software-auto-destroying board (SAD board) mounted in an expansion slot of the computer;
   (b) a memory for storing the software to be protected on the SAD board;
   (c) a sealed detector, for detecting any unallowable electronical and physical interrogating (i.e. any physical and electronic interrogation which is not set up by those who designed the software protection system) externally upon the main information parts (including BIOS chip) of the computer, the detector itself, and the memory storing the software, and for generating a destruction signal in response to such detection;
   (d) means responsive to the destruction signal, for destroying the function of the memory which storing the software, so that the software stored in the memory is destroyed.
   (e) means for blocking the ways of controlling the computer to perform work other than that which is set up within the software stored in the memory;
   (f) means for sealing all the main information parts (including the BIOS chip) of the computer, the memory which storing the software, the detector mentioned above, and all vacant slots;
   (g) means for converting monitor-signals of the computer to video-signals, and inputting them into a video-printer to print out the outputs; and
   (h) means for, using an electronic key, starting execution of the software stored in the memory to be working, when a password input by a user is compatible with the electronic key.

2. The system according to claim 1, wherein the memory is a random access memory on the SAD board.

3. The system according to claim 1, wherein the detector detects removal of the SAD board from the expansion slot, and generates a high voltage signal as the destruction signal.

4. The system according to claim 1, wherein the detector detects copying of the stored software from the memory of the SAD board.

5. The system according to claim 1, wherein the SAD board and the BIOS chip of the computer have terminals, and further comprising a sealing compound surrounding the terminals.

6. The system according to claim 1, wherein the computer is no harddriver, no floppydriver and the correspondent controller, no serial-port and no-parallel-port; and further comprising a BIOS chip on the mother board which programmed to only enable the computer to recognize and respond to a limited number of keys on the keyboard.

7. The system according to claim 6, wherein the limited number of keys are: y, n, f, m, 0–9, enter, backup, space, shift, reset, f6, f7 and f10.

8. The system according to claim 6; and further comprising BAT file management means for controlling the operation of the software, and for preventing the computer from operating under control of a disc operating system, said BAT file management means including a plurality of operational subroutines, each selected by one of said limited number of keys; and for preventing the computer from performing any work other than that which is set up by the designer within the software stored in the memory.

9. The system according to claim 1, wherein the means for sealing is a kind of hard glue.

10. The means for sealing according to claim 9, wherein the glue is epoxy glue.

11. A method of protecting software, comprising the steps of:
   (a) mounting a SAD board in an expansion slot of a computer;
   (b) storing the software to be protected on the SAD board;
   (c) using a sealed detector for detecting any unallowable electronical and physical interrogating (i.e. any physical and electronic interrogation which is not set up by those who designed the software protection system) externally upon the main information parts (including BIOS chip) of the computer, the detector itself, and the memory storing the software, and generating a destructing signal in response to such detection;
   (d) destroying the stored software in response to generation of the destruction signal which destroying the function of the memory storing the software, so that the software stored in the memory is destroyed.
   (e) sealing all the main information parts (including the BIOS chip) of the computer, the memory which storing the software, the detector mentioned above, and all the vacant slots;
   (f) blocking all the way of controlling the computer to perform work other than that which is set up within the software stored in the memory;
   (g) using converting monitor-signals of the computer to video-signals, and inputting them into a video-printer to print out the output; and
   (h) using an electronic key starting execution of the software stored in the memory, when a password input by a user is compatible with the electronic key.

12. The method according to claim 11, wherein the detecting step is performed by detecting physical removal of the SAD board from the expansion slot.

13. The method according to claim 11, wherein the detecting step is performed by detecting copying of the stored software from the memory of the SAD board.

14. The method according to claim 11, wherein the destroying step is performed by applying a higher voltage signal as the destruction signal to the memory on the SAD board.

15. The system according to claim 1 or 11, wherein the detector is a circuit, which has many terminates touching with every main information part, every vacant slot, and the detector itself.

16. The system according to claim 1 or 11, wherein the detector not only detects unallowable electronical and physical interrogating (i.e. any physical and electronic interrogation which is not set up by those who designed the software protection system) externally upon the main information parts (including BIOS chip) of the computer and the memory storing the software, but also the unallowable interrogating externally upon the detector itself.

* * * * *